United States Patent
Tran et al.

(10) Patent No.: US 9,155,436 B2
(45) Date of Patent: Oct. 13, 2015

(54) VACUUM CLEANER WITH LOUVERED EXHAUST GRILL

(75) Inventors: Phong H. Tran, Caledonia, MI (US); Jeffrey A. Scholten, Ada, MI (US); James P. Tol, Cedar Springs, MI (US)

(73) Assignee: BISSELL Homecare, Inc., Grand Rapids, MI (US)

(*) Notice: Subject to any disclaimer, the term of this patent is extended or adjusted under 35 U.S.C. 154(b) by 519 days.

(21) Appl. No.: 13/338,599

(22) Filed: Dec. 28, 2011

(65) Prior Publication Data
US 2012/0167336 A1 Jul. 5, 2012

Related U.S. Application Data

(60) Provisional application No. 61/427,976, filed on Dec. 29, 2010.

(51) Int. Cl.
| | |
|---|---|
| *A47L 9/16* | (2006.01) |
| *A47L 9/12* | (2006.01) |
| *B04C 5/13* | (2006.01) |
| *B04C 5/26* | (2006.01) |

(52) U.S. Cl.
CPC ............. *A47L 9/1633* (2013.01); *A47L 9/122* (2013.01); *A47L 9/1666* (2013.01); *B04C 5/13* (2013.01); *B04C 5/26* (2013.01); *B01D 2279/55* (2013.01); *B04C 2005/136* (2013.01)

(58) Field of Classification Search
CPC ... A47L 9/1666; A47L 9/1683; A47L 9/1608; A47L 7/0028; A47L 7/0038; A47L 7/0042; A47L 9/1633; A47L 9/122; A47L 9/10; B04C 5/13; B04C 5/26; B04C 2005/136
USPC .......... 15/327.1, 327.2, 327.6, 347, 352, 353; 55/413, 424, 426, 429, 346
See application file for complete search history.

(56) References Cited

U.S. PATENT DOCUMENTS

| | | | |
|---|---|---|---|
| 2,078,761 | A | 4/1937 | Herrlinger |
| 2,943,698 | A | 7/1960 | Bishop |
| 4,268,288 | A | 5/1981 | Coombs |
| 5,287,591 | A | 2/1994 | Rench et al. |
| 5,307,538 | A | 5/1994 | Rench et al. |
| 5,363,535 | A | 11/1994 | Rench et al. |
| 6,090,174 | A | 7/2000 | Douma et al. |
| 6,238,451 | B1 | 5/2001 | Conrad et al. |
| 6,383,266 | B1 | 5/2002 | Conrad et al. |

(Continued)

FOREIGN PATENT DOCUMENTS

| | | |
|---|---|---|
| CN | 1440716 A | 9/2003 |
| CN | 1817476 A | 8/2006 |

(Continued)

OTHER PUBLICATIONS

Javier Lopez Vega, Partial European Search Report, Jun. 21, 2013, 2 pages, Munic.

(Continued)

*Primary Examiner* — Robert Scruggs
(74) *Attorney, Agent, or Firm* — McGarry Bair PC

(57) ABSTRACT

A vacuum cleaner with a separation module comprises an exhaust grill positioned fluidly between a separator chamber and an air outlet. The exhaust grill can comprise a body having a plurality of louvers and a plurality of inlets defined between adjacent louvers.

16 Claims, 11 Drawing Sheets

(56) References Cited

U.S. PATENT DOCUMENTS

| | | |
|---|---|---|
| 6,482,252 B1 | 11/2002 | Conrad et al. |
| 6,702,868 B2 | 3/2004 | Oh et al. |
| 6,740,144 B2 | 5/2004 | Conrad et al. |
| 6,766,558 B1 | 7/2004 | Matsumoto et al. |
| 6,818,033 B2 | 11/2004 | North |
| 6,857,165 B2 | 2/2005 | Oh |
| 6,896,711 B2 * | 5/2005 | Oh .................................. 55/337 |
| 7,179,314 B2 | 2/2007 | Conrad et al. |
| 7,210,195 B2 | 5/2007 | Howie et al. |
| 7,410,517 B2 | 8/2008 | Han et al. |
| 7,416,575 B2 | 8/2008 | Oh et al. |
| 7,544,224 B2 | 6/2009 | Tanner et al. |
| 7,547,338 B2 | 6/2009 | Kim et al. |
| 7,559,965 B2 | 7/2009 | Oh et al. |
| 7,594,943 B2 | 9/2009 | Oh et al. |
| 7,615,089 B2 | 11/2009 | Oh |
| 7,704,290 B2 | 4/2010 | Oh |
| 7,731,771 B2 | 6/2010 | Lee et al. |
| 7,749,292 B2 * | 7/2010 | Pan et al. ......................... 55/345 |
| 7,785,383 B2 | 8/2010 | Oh et al. |
| 2004/0068826 A1 * | 4/2004 | Howie et al. .................... 15/353 |
| 2004/0098828 A1 | 5/2004 | Oh |
| 2007/0175185 A1 * | 8/2007 | Kim et al. ....................... 55/337 |
| 2007/0199284 A1 | 8/2007 | Yoo et al. |
| 2009/0300871 A1 * | 12/2009 | Seo et al. ........................ 15/347 |
| 2010/0005617 A1 | 1/2010 | Hyun et al. |

FOREIGN PATENT DOCUMENTS

| | | |
|---|---|---|
| CN | 1839743 A | 10/2006 |
| CN | 2899953 Y | 5/2007 |
| CN | 101006910 A | 8/2007 |
| DE | 19938769 A1 | 3/2001 |
| EP | 1475028 B1 | 11/2004 |
| GB | 2375980 B | 8/2003 |
| GB | 2395677 A | 6/2004 |
| GB | 2397785 A | 8/2004 |
| GB | 2427841 A | 1/2007 |
| GB | 2445211B B | 11/2008 |
| JP | 2003180585 A | 7/2003 |
| WO | 2002078505 A2 | 10/2002 |
| WO | 2010085050 A2 | 4/2010 |

OTHER PUBLICATIONS

Notification of First Office Action, May 6, 2015, 8 pages, Beijing, People's Republic of China.

* cited by examiner

VACUUM CLEANER WITH LOUVERED EXHAUST GRILL

CROSS REFERENCE TO RELATED APPLICATIONS

This application claims the benefit of U.S. Provisional Patent Application No. 61/427,976, filed Dec. 29, 2010, which is incorporated herein by reference in its entirety.

BACKGROUND

Upright vacuum cleaners employing cyclone separators are well known. Some cyclone separators use frusto-conical-shaped separators and others use high-speed rotational motion of the air/dirt to separate the dirt by centrifugal force. Typically, working air enters and exits at an upper portion of the cyclone separator as the bottom portion of the cyclone separator is used to collect debris. Before exiting the cyclone separator, the working air may flow through an exhaust grill. The exhaust grill can have perforations or holes through which air may pass, or may have vanes or louvers defining openings through which air may pass.

BRIEF SUMMARY

According to one embodiment of the invention, a vacuum cleaner comprises a housing having a suction nozzle, a separation module having at least one separator chamber and an air outlet, a suction source fluidly connected to the suction nozzle and to the separation module for establishing and maintaining a dirt-containing working airstream from the suction nozzle to the at least one separator chamber, and an exhaust grill positioned downstream of the at least one separator chamber and upstream of the air outlet.

In one aspect of the invention, the exhaust grill can comprise a plurality of louvers, and a plurality of inlets defined between adjacent louvers, wherein at least one of the louvers comprises an airfoil configured to deflect dirt away from at least one of the plurality of inlets.

DETAILED DESCRIPTION

The invention relates to vacuum cleaners and in particular to vacuum cleaners having cyclonic dirt separation. In one of its aspects, the invention relates to an improved exhaust grill for a cyclone module assembly. For purposes of description related to the figures, the terms "upper," "lower," "right," "left," "rear," "front," "vertical," "horizontal," and derivatives thereof shall relate to the invention as oriented in FIG. 1 from the perspective of a user behind the vacuum cleaner, which defines the rear of the vacuum cleaner. However, it is to be understood that the invention may assume various alternative orientations, except where expressly specified to the contrary.

Figure 1:
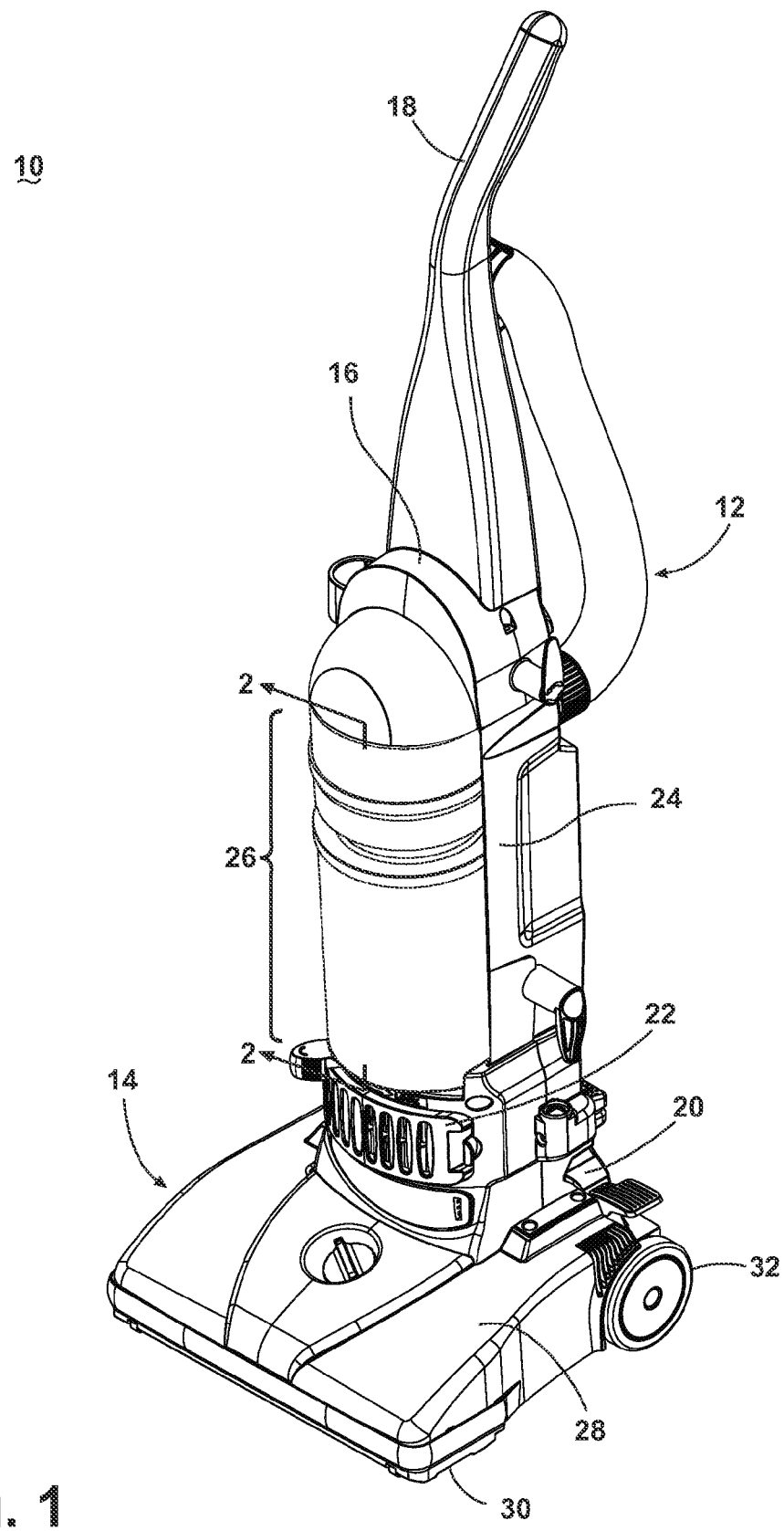
FIG. 1 is a perspective view of a vacuum cleaner having a cyclone module assembly according to a first embodiment of the invention.

Referring to the drawings, and in particular to FIG. 1, an upright vacuum cleaner 10 comprises an upright handle assembly 12 pivotally mounted to a foot assembly 14. The handle assembly 12 further comprises a primary support section 16 with a grip 18 on one end to facilitate movement by a user. A motor cavity 20 is formed at an opposite end of the handle assembly 12 to contain a conventional suction source such as a vacuum fan/motor assembly (not shown) oriented transversely therein. A filter housing 22 is formed above the motor cavity 20 and is in fluid communication with the vacuum fan/motor assembly. The handle assembly 12 pivots relative to the foot assembly 14 through a pivot axis that is coaxial with a motor shaft (not shown) associated with the vacuum fan/motor assembly. A mounting section 24 on the primary support section 16 of the handle assembly 12 receives a separation module 26 according to a first embodiment of the invention for dirt and other contaminants from a dirt-containing working airstream. As illustrated herein, the separation module is shown as a cyclone module assembly 26. However, it is understood that other types of separation modules can be used, such as centrifugal separators or bulk separators.

The foot assembly 14 comprises a housing 28 with a suction nozzle 30 formed at a lower surface thereof and that is in fluid communication with the vacuum fan/motor assembly. While not shown, an agitator can be positioned within the housing 28 adjacent the suction nozzle 30 and operably connected to a dedicated agitator motor, or to the vacuum fan/motor assembly within the motor cavity 20 via a stretch belt as is common in the vacuum cleaner art. Rear wheels 32 are secured to a rearward portion of the foot assembly 14 and a pair of support wheels (not shown) are secured to a forward portion of the foot assembly 14 for moving the foot assembly 14 over a surface to be cleaned.

Figure 2:
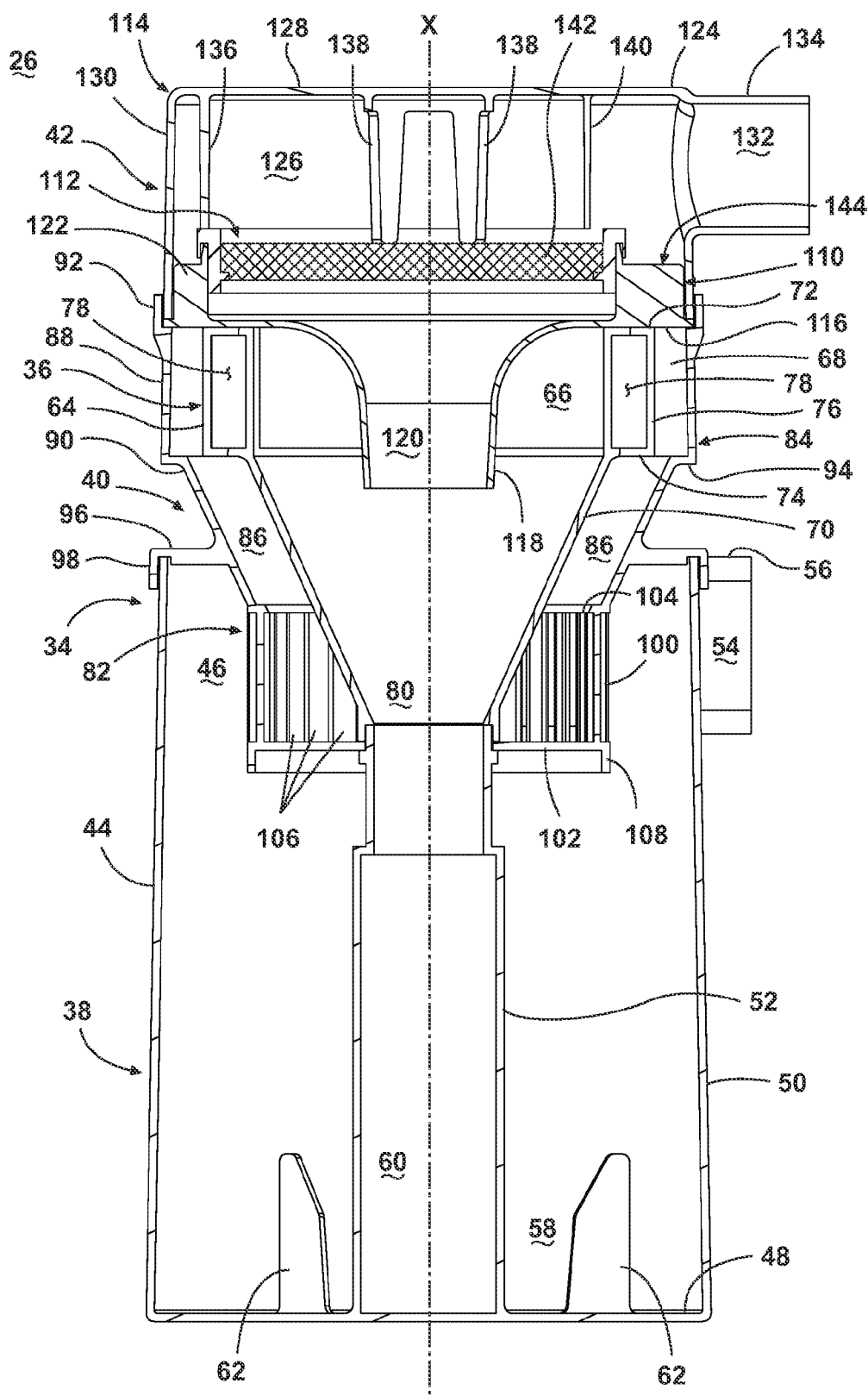
FIG. 2 is a cross-sectional view of the cyclone module assembly taken through line 2-2 of FIG. 1.
Figure 3:
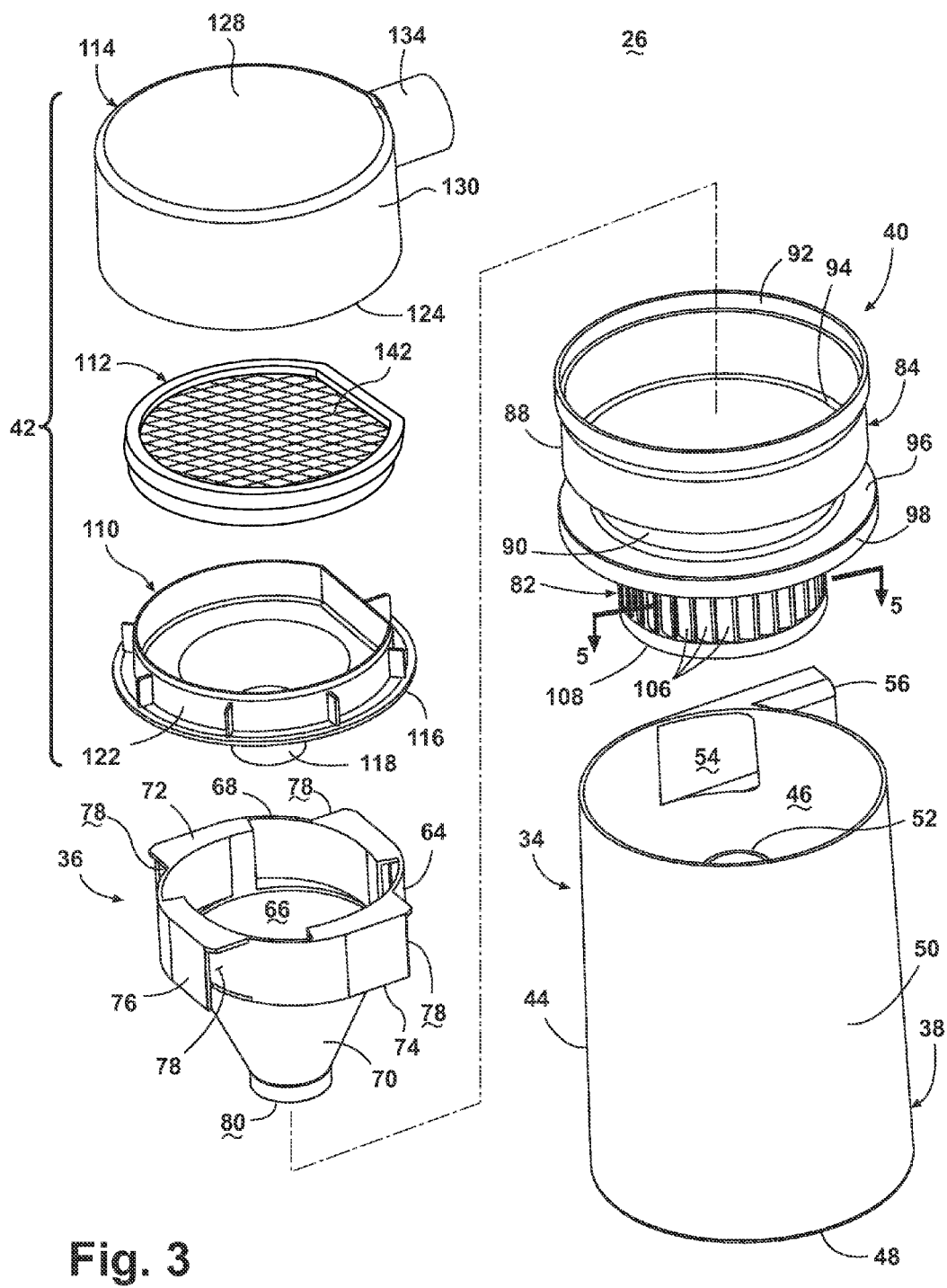
FIG. 3 is an exploded perspective view of the cyclone module assembly of FIG. 1.

Referring to FIGS. 2-3, the cyclone module assembly 26 of the first embodiment comprises a dual-stage cyclone separator for separating contaminants from a dirt-containing working airstream, with a first stage separator 34 and a second stage separator 36, which is downstream and concentrically arranged with the first stage separator. As illustrated, the first stage separator 34 is integrally formed with a dirt cup 38 which receives contaminants separated by the first and second stage separators 34, 36. The cyclone module assembly 24 further includes a first outlet assembly 40 for guiding working air from the first stage separator 34 to the second stage separator 36, and a second outlet assembly 42 for guiding working air from the second stage separator 36 out of the cyclone module assembly 26. Seals or gaskets (not shown), can be positioned between components of the cyclone module assembly 26, such as between mating components of the first stage separator 34 and the second stage separator 36, between mating components of the first stage separator 34 and the first outlet assembly 40, between mating components of the second stage separator 36 and the first outlet assembly 40, and between mating components of the first outlet assembly 40 and the second outlet assembly 42.

The first stage separator 34 and dirt cup 38 have a common housing 44 defining, at least in part, a first stage separator chamber 46. The housing 44 has a bottom wall 48 with a generally cylindrical outer wall 50 extending upwardly from the bottom wall 48 to an open top, and an inner wall 52 extending upwardly from the bottom wall 48 to an open top and that is, inwardly spaced from the outer wall 50 in concentric relation. An inlet 54 to the first stage separator chamber 46 is formed in the outer wall 50 and is defined by an inlet conduit 56 extending outwardly from the outer wall 50. While not illustrated, the inlet conduit 56 is in fluid communication with the suction nozzle 30 (FIG. 1). While the first stage separator 34 and dirt cup 38 are shown herein as being integrally formed, it is also contemplated that the cyclone module assembly 24 can be provided with a separate dirt cup.

The dirt cup 38 includes a first stage collection chamber 58 formed between the outer and inner walls 50, 52 and a second stage collection chamber 60 formed within the inner wall 52 and sealed off from the first stage collection chamber 58. One or more upstanding projection(s) 62, such as a fin or finger, can protrude upwardly from the inner surface of bottom wall 48, or inwardly from the inner surface of the outer wall 50, within the first stage collection chamber 58 to inhibit the vacillation of the debris deposited in the dirt cup 38, thereby disrupting the currents that would tend to carry smaller dirt particles upwardly and back into the cyclonic air flow. The projections 62 can also deflect dirt particles within the dirt cup 38 to further encourage agglomeration of the dirt particles within the dirt cup 38. While the dirt cup 38 is shown herein as having a closed or fixed bottom wall 48, it is also contemplated that the bottom wall 48 can be selectively openable or have a moveable cover to provide for a bottom-empty dirt cup 38.

The second stage separator 36 has a frusto-conically shaped housing 64 defining, at least in part, a second stage separator chamber 66. The housing 64 includes an upper cylindrical portion 68 and a lower frusto-conical portion 70. The cylindrical portion 68 includes a top wall 72 and a bottom wall 74 joined by a side wall 76. One or more inlets 78 to the second stage separator chamber 66 can be formed in the side wall 76. As illustrated, the side wall 76 is non-continuous, and four evenly spaced inlets 78 are formed by the non-continuous portions of the side wall 76. A debris outlet 80 is formed in the bottom of the frusto-conical portion 70 and mates with the open top of the inner wall 52 to place the debris outlet 80 in communication with the second stage collection chamber 60.

The first outlet assembly 40 includes an exhaust grill 82 positioned around a portion of the inner wall 52 of the dirt cup 38 and/or the frusto-conical portion 70 of the second stage separator 36 and an outlet housing 84 which defines a passageway 86 between the exhaust grill 82 and the inlets 78 to the second stage separator 36. As illustrated herein, the exhaust grill 82 and outlet housing 84 can be integrally formed; alternatively, the exhaust grill 82 can be formed separately from the outlet housing 84.

The outlet housing 84 includes an upper cylindrical portion 88 and a lower frusto-conical portion 90. The cylindrical portion 88 includes an open upper end having a lip 92 and an open lower end having a step 94 projecting inwardly toward the second stage separator 36. When assembled, the bottom wall 74 of the second stage separator 36 abuts the step 94. A cover 96 extends outwardly from the frusto-conical portion 90 and includes a lip 98 at an outer periphery thereof. The cover 96 sealingly mates with the housing 44, with the lip 98 received on the upper edge of the outer wall 50 to close the open top of the housing 44.

The exhaust grill 82 separates the first stage separator chamber 46 from the passageway 86 and includes a generally cylindrical body 100 having a closed bottom wall 102, an open upper wall 104 which is connected to the lower frusto-conical portion 90 of the outlet housing 84, and a plurality of vanes or louvers 106 extending longitudinally between the bottom wall 102 and the upper wall 104. As illustrated, the louvers 106 are vertically-oriented and extend generally parallel to a central axis X of the cyclone module assembly 26. The bottom wall 102 includes a downwardly depending peripheral flange 108, which creates a more tortuous path for the working air to exit from the first stage separator 34 and increases dirt separation. While not shown, a foam filter may be provided on the exterior or interior of the exhaust grill 82. Such a foam filter may be useful when the exhaust grill 82 is employed with a single stage cyclone module assembly, rather than the illustrated dual-stage cyclone module assembly 26.

The second outlet assembly 42 includes an outlet cover 110 for the second stage separator 36, a filter assembly 112 selectively received by the outlet cover 110, and an exhaust cap 114 for enclosing the filter assembly 112 and for exhausting working air from the cyclone module assembly 26. As illustrated herein, the outlet cover 110 and exhaust cap 114 can be formed separately, alternatively, the outlet cover 110 and exhaust cap 114 can be integrally formed.

The outlet cover 110 includes a radially-extending wall 116 which rests on the top wall 72 of the cylindrical portion 68 of the second stage separator 36 to close the second stage separator chamber 66 and a vortex finder 118 extending downwardly from a central portion of the wall 116 into the second stage separation chamber 66. The vortex finder 118 defines an air outlet 120 of the second stage separation chamber 66. The outlet cover 110 can further include a filter receiver 122 extending upwardly from the wall 116 for receiving the filter assembly 112, such that air passing through the air outlet 120 must also pass through the filter assembly 112.

The exhaust cap 114 includes an exhaust cap housing 124 defining, at least in part, an outlet chamber 126. The filter assembly 112 and/or filter receiver 122 also define a portion of the outlet chamber 126. The exhaust cap housing 124 has a top wall 128 with a generally cylindrical outer wall 130 extending downwardly from the top wall 128 to an open bottom. An outlet 132 from the outlet chamber 126 is formed in the outer wall 130 and is defined by an outlet conduit 134 extending outwardly from the outer wall 130. While not illustrated, the outlet conduit 134 is in fluid communication with the vacuum fan/motor assembly in the motor cavity 20 (FIG. 1).

One or more depending projection(s), including, but not limited to, a wall, finger, or rib, can protrude downwardly from of the inner surface of top wall 128 within the outlet chamber 126. When working air is flowing through the cyclone module assembly 26, the projection(s) can at least partially hold the filter assembly 112 in position within the filter receiver 122. As illustrated, the projections include a rib 136 that extends downwardly from the top wall 128 and is inwardly spaced from the outer wall 130 in concentric relation, and multiple fingers 138 that extend downwardly from the top wall 128 and is inwardly spaced from the rib 136 in concentric relation. The rib 136 may be semi-circular in shape, with a break 140 in the rib 136 at least partially aligned with the outlet 132. While only two fingers 138 are visible in FIG. 2, the exhaust cap 114 can be provided with four evenly spaced fingers 138. The fingers 138 are arranged around the central axis X of the cyclone module assembly 26, and can be closer to the center of the top wall 128 than to the rib 136 and/or the outer wall 130.

The filter assembly 112 includes a filter media 142 fluidly positioned between the second stage separator 36 and the outlet chamber 126. The filter media 142 can comprise a non-porous or porous media, or a pleated or non-pleated media. For example, the filter media 142 can be a non-porous, pleated filter, such as a HEPA filter. In another example, the filter media 142 can be a porous, non-pleated filter, such as a sponge-type filter. The filter assembly 112 can be accessible to a user for periodic cleaning and/or replacement of the filter media 142.

Figure 4:
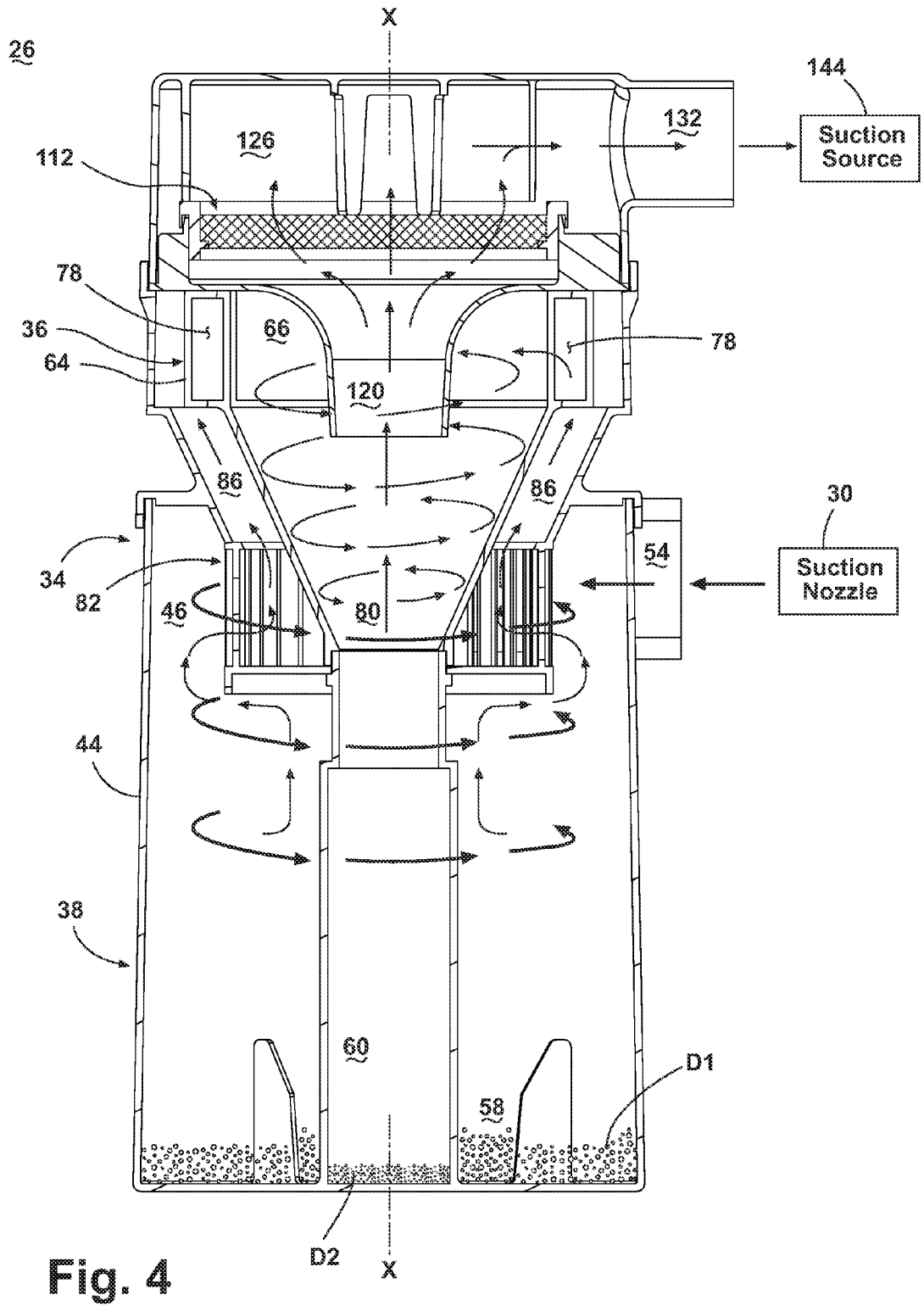
FIG. 4 is a cross-sectional view of the cyclone module assembly taken through line 2-2 of FIG. 1, showing the flow path of working air through the cyclone module assembly.

Referring to FIG. 4, in which the flow path of working air is indicated by arrows, the operation of the cyclone separation module 26 will be described. A suction source 144, such as the vacuum fan/motor assembly in the motor cavity 20 (FIG. 1), when energized, draws dirt and dirt-containing air from the suction node 30 to the inlet 54 and into the cyclone separation module 26 where the dirty air to swirls around the first stage separator chamber 46. It is noted that while the working air within the first stage separator chamber 46 flows along an airflow path having both horizontal and vertical components with respect to the central axis X, the magnitude of the horizontal component is greater than the magnitude of the vertical component. Larger or coarser debris D1 falls into the first stage collection chamber 58 of the dirt cup 38. The working air, which still contains some smaller or finer debris, then passes through the exhaust grill 82 which, as explained below, can separate out some additional debris, and enters the passageway 86. From the passageway 86, the working air enters the second stage separator chamber 66 via the inlets 78. The inlets 78 direct the working air tangentially and downwardly along an inside surface of the housing 64. The airflow turns near the debris outlet 80, which causes smaller or finer debris D2 to separate and fall into the second stage collection chamber 60. The working air then proceeds directly upward to the air outlet 120 and through the filter assembly 112, which can remove debris remaining in the working air. From the filter assembly 112, the working air passes into the outlet chamber 126 and through the outlet 132.

To dispose of collected dirt and dust, the housing 44 is detached from the vacuum cleaner 10 to provide a clear, unobstructed path for the debris captured in both the first stage collection chamber 58 and the second stage collection chamber 60 to be removed. Dust and dirt disposal is accomplished by inverting the housing 44.

Figure 5:
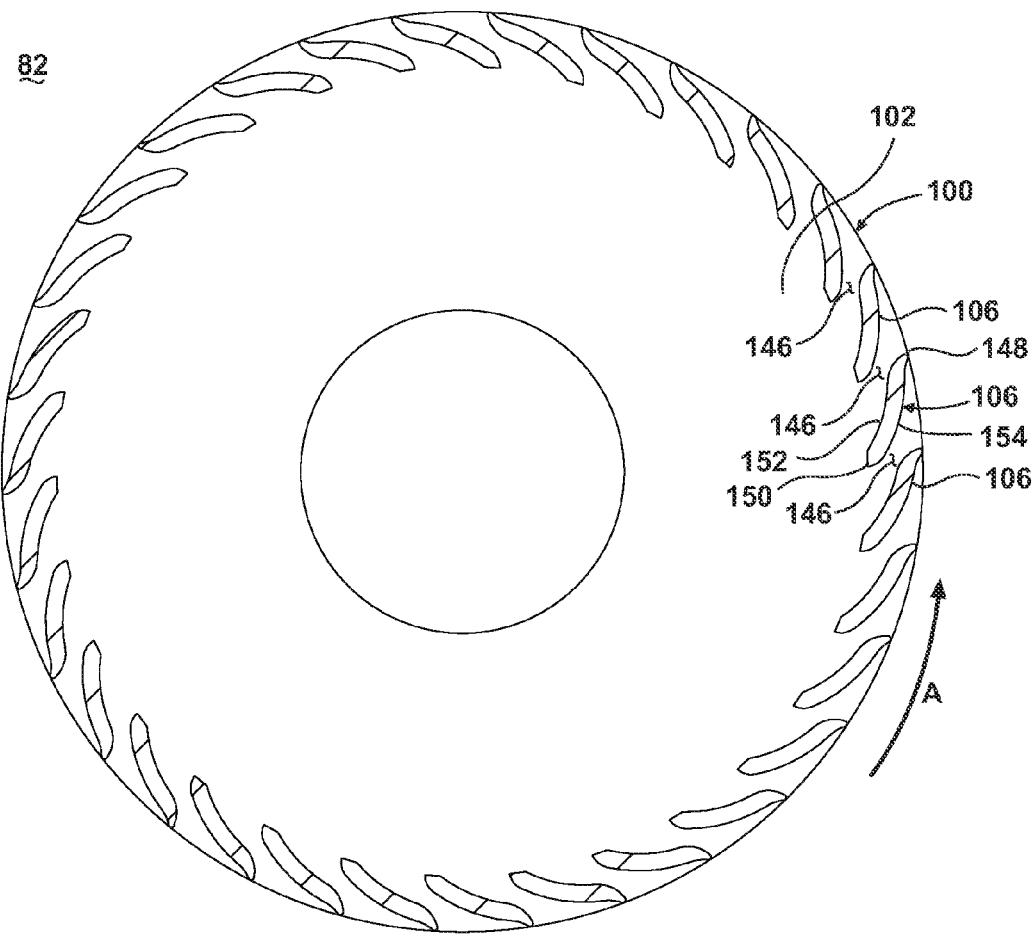
FIG. 5 is a cross-sectional view taken through line 5-5 of FIG. 3, of an exhaust grill of the cyclone module assembly.

FIG. 5 is a cross-sectional view of the exhaust grill 82 taken through line 5-5 of FIG. 3. The louvers 106 are spaced from each other to form a plurality of gaps 146, and the gaps 146 between the louvers 106 form air inlets to the passageway 86 leading to the second stage separator 36 (FIG. 2). Working air, which includes some entrained dirt particles, generally flows around the exhaust grill 82 in a flow direction indicated by arrow A. As noted above for FIG. 2, while the working air flows along a path having both horizontal and vertical components, the magnitude of the horizontal component is greater than the magnitude of the vertical component, and so for purposes of simplification, is represented with respect to the exhaust grill 82 by the arrow A having only a horizontal component with respect to central axis X.

Figure 6:
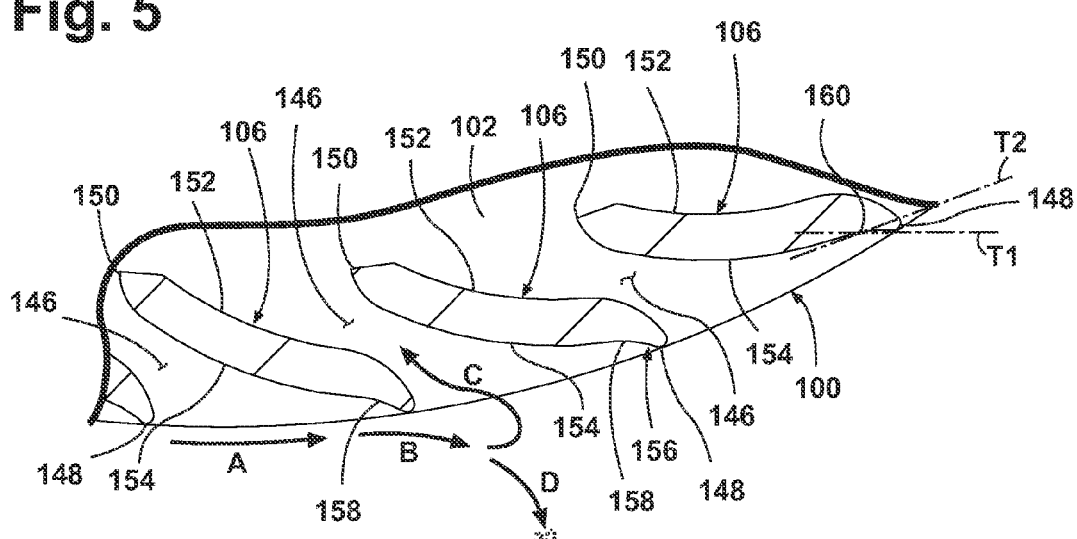
FIG. 6 is an enlarged view of a portion of the exhaust grill from FIG. 5.

FIG. 6 is an enlarged view of a portion of the exhaust grill 82. Each louver 106 includes an outer leading end 148 and an inner trailing end 150, which represent the ends of the louver 106 that firstly and lastly encounter the working air stream passing around the louver 106. Two opposing sides or edges extend between the leading and trailing ends 148, 150; a downstream side or edge defining a downstream surface 152 of the louver 106 and an upstream side or edge defining an upstream surface 154 of the louver 106. Each gap 146 is formed by the upstream surface 154 of a first louver 106 and the downstream surface 152 of a second louver 106 that is immediately adjacent the first louver 106 in a direction opposite the flow direction A.

The leading end 148 can include an airfoil tip 156 that is configured to deflect dirt particles away from the gap 146. In the illustrated embodiment, the airfoil tip 156 is formed by a curved guide surface 158 formed on the upstream surface 154. The guide surface 158 can be located at the outermost portion of the upstream surface 154. The guide surface 158 can have a smaller radius of curvature toward the leading end 148 as compared with the radius of curvature of the upstream surface 154 toward the trailing end 150. The guide surface 158 includes a transition point 160 which defines the point at which the slope of a first tangent line T1 on the side of the transition point 160 closer to the leading end 148 is less than the slope of a second tangent line T2 on the side of the transition point 160 closer to the trailing end 150, which results in a concave crescent shape on the upstream surface 154 of the airfoil tip 156.

In operation, working air generally flows around the exhaust grill 82 in a flow direction indicated by arrow A. The airfoil tip 156 directs the working air in an outward radial direction from the louver 106, as indicated by arrow B. This increases the radial velocity of the deflected working air in comparison to the radial velocity along the flow path indicated by arrow A. The increased velocity of the working air along arrow B increases the momentum of dirt particles entrained in the working air. The working air then turns back in toward louvers 106 and enters the interior of the exhaust grill 82 through the gaps 146, as indicated by arrow C. Due to their increased momentum, at least some dirt particles may continue to move in an outward radial direction from the louver 106, as indicated by arrow D, while working air turns back in toward the louver 106. The dirt particles D are thereby separated from the working air and fall into the first stage collection chamber 58 of the dirt cup 38 (FIG. 4), and do not enter the interior of the exhaust grill 82.

Figure 7:
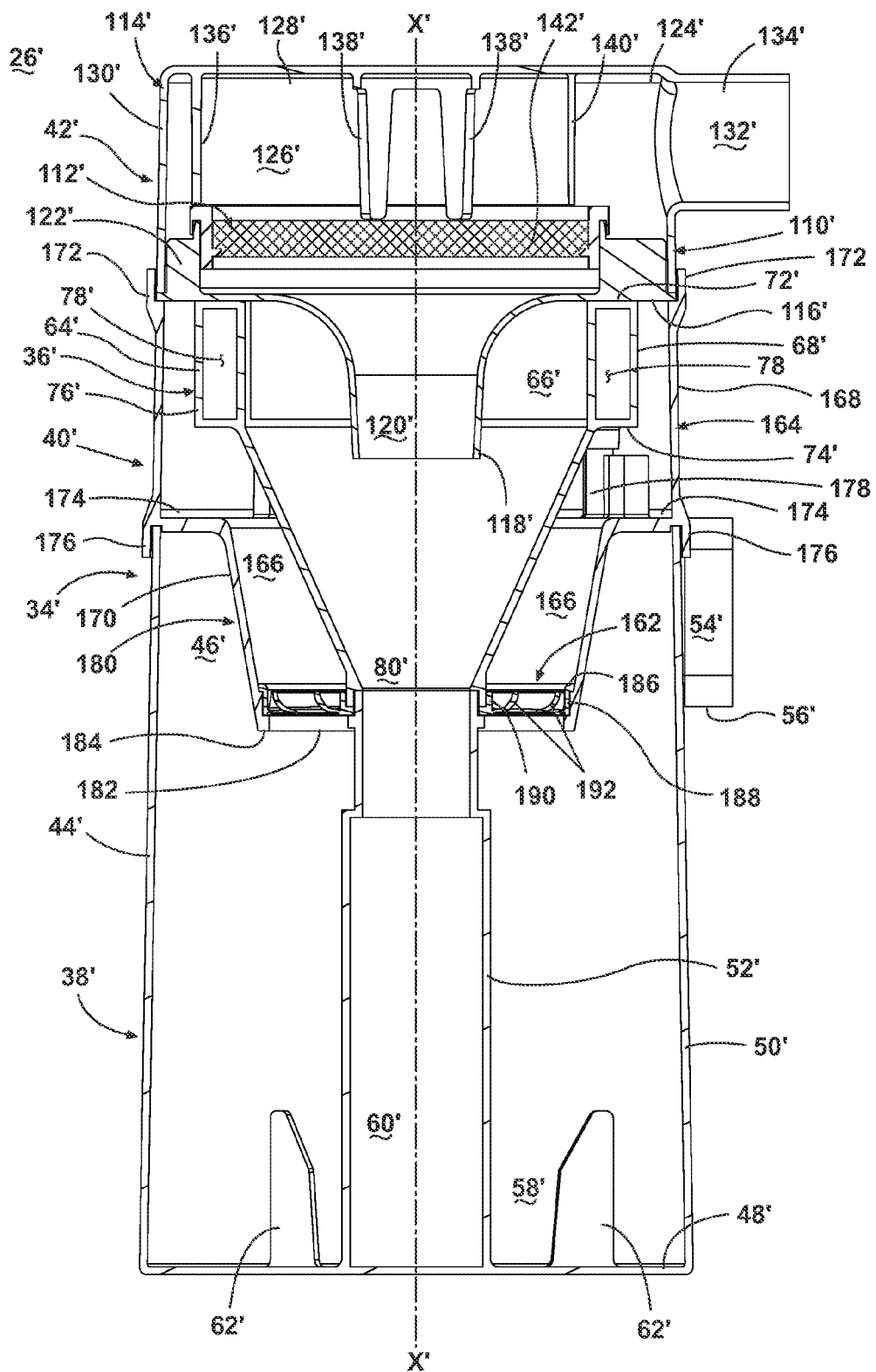
FIG. 7 is a cross-sectional view of a cyclone module assembly according to a second embodiment of the invention.
Figure 8:
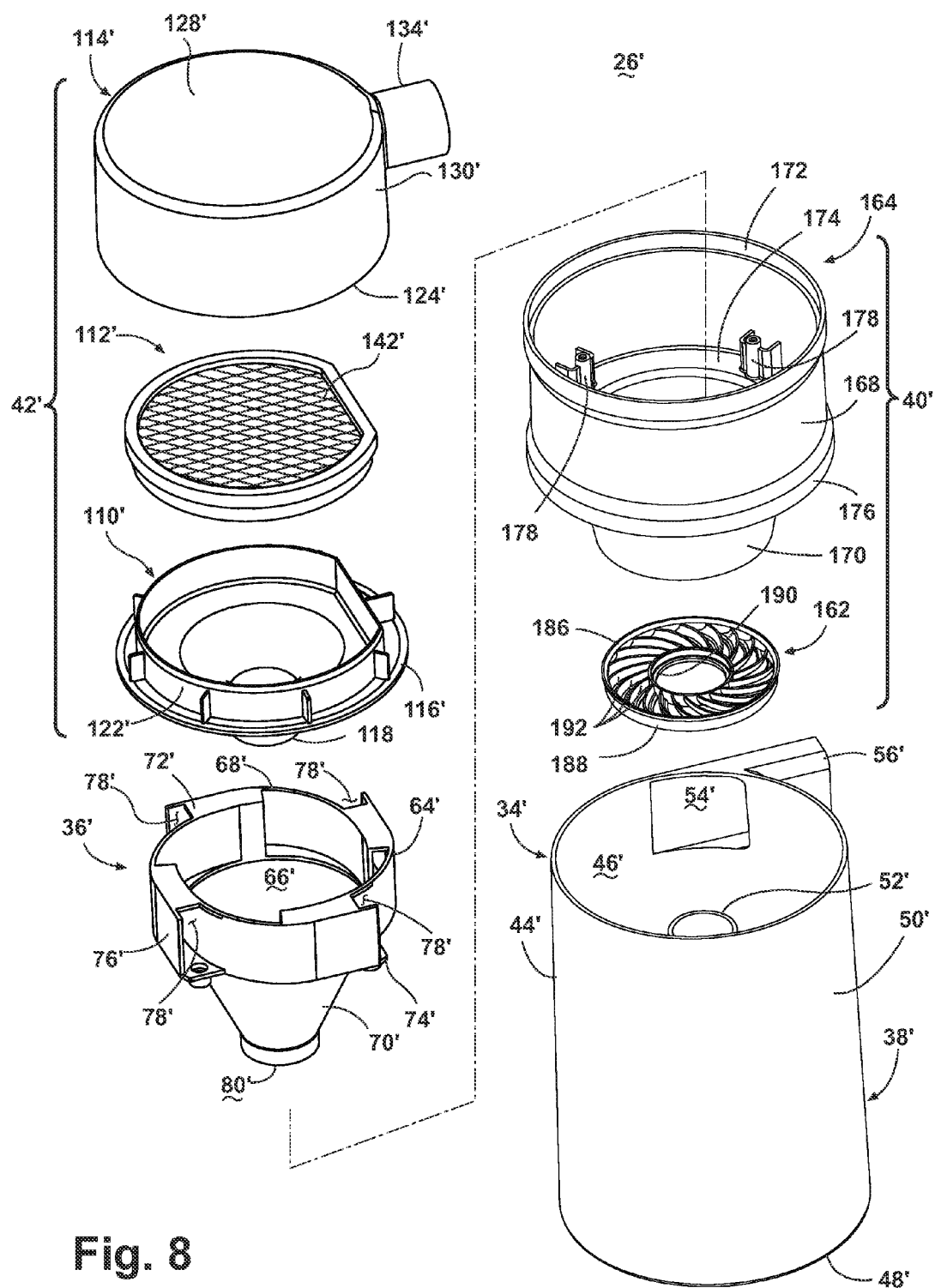
FIG. 8 is an exploded perspective view of the cyclone module assembly of FIG. 7.

FIGS. 7-8 illustrate a cyclone module assembly 26' according to a second embodiment of the invention. The cyclone module assembly 26' is substantially identical to the cyclone module assembly 26 shown in FIGS. 1-4, with the exception of the first outlet assembly 40'. In the second embodiment, the first outlet assembly 40' includes an exhaust grill 162 positioned around a portion of the inner wall 52' of the dirt cup 38' and/or the frusto-conical portion 70' of the second stage separator 36' and an outlet housing 164 which defines a passageway 166 between the exhaust grill 162 and the inlets 78' to the second stage separator 36'. As illustrated herein, the exhaust grill 162 and outlet housing 164 can be formed separately; alternatively, the exhaust grill 164 and outlet housing 164 can be integrally formed.

The outlet housing 164 includes an upper cylindrical portion 168 and a lower frusto-conical portion 170. The cylindrical portion 168 includes an open upper end having a lip 172 and an open lower end having a step 174 projecting inwardly toward the second stage separator 36'. When assembled, the bottom wall 74' of the second stage separator 36' is spaced from the step 174. The step 174 forms a cover for the first stage separator 34' and dirt cup 38' that extends inwardly to join the frusto-conical portion 170 and includes a lip 176 at an outer periphery thereof. The step/cover 174 sealingly mates with the housing 44', with the lip 176 received on the upper edge of the outer wall 50' to close the open top of the housing 44'. One or more spacers 178 can extend upwardly from an upper surface of the step 174 and, when assembled, the bottom wall 74' of the second stage separator 36' can abut the spacer(s) 178. Fasteners (not shown) can be attached between the spacer(s) 178 and the second stage separator 36'.

The frusto-conical portion 170 extends downwardly from the step 174, and includes a conical side wall 180 with an open lower end 182. In the illustrated embodiment, the side wall 180 is unperforated, and does not include an opening for the passage of air therethough. The exhaust grill 162 is received within the frusto-conical portion 170, close to the open lower end 182. The frusto-conical portion 170 can include a depending peripheral flange 184 that extends downwardly past the exhaust grill 162, which creates a more tortuous path for the working air to exit from the first stage separator 34' and increases dirt separation. While not shown, a foam filter may be provided on the exterior or interior of the exhaust grill 162. Such a foam filter may be useful when the exhaust grill 162 is employed with a single stage cyclone module assembly, rather than the illustrated dual-stage cyclone module assembly 26'.

The exhaust grill 162 separates the first stage separator chamber 46' from the passageway 166, and includes a generally flat body 186 having circular shape. The body 186 can be ring-shaped, with a circular outer wall 188, a circular inner wall 190 that is radially-spaced inwardly from the outer wall 188, and a plurality of vanes or louvers 192 extending longitudinally between the inner and outer walls 188, 190. As illustrated, the louvers 192 are horizontally-oriented and extend generally radially from the central axis X' of the cyclone module assembly 26'.

Figure 9:
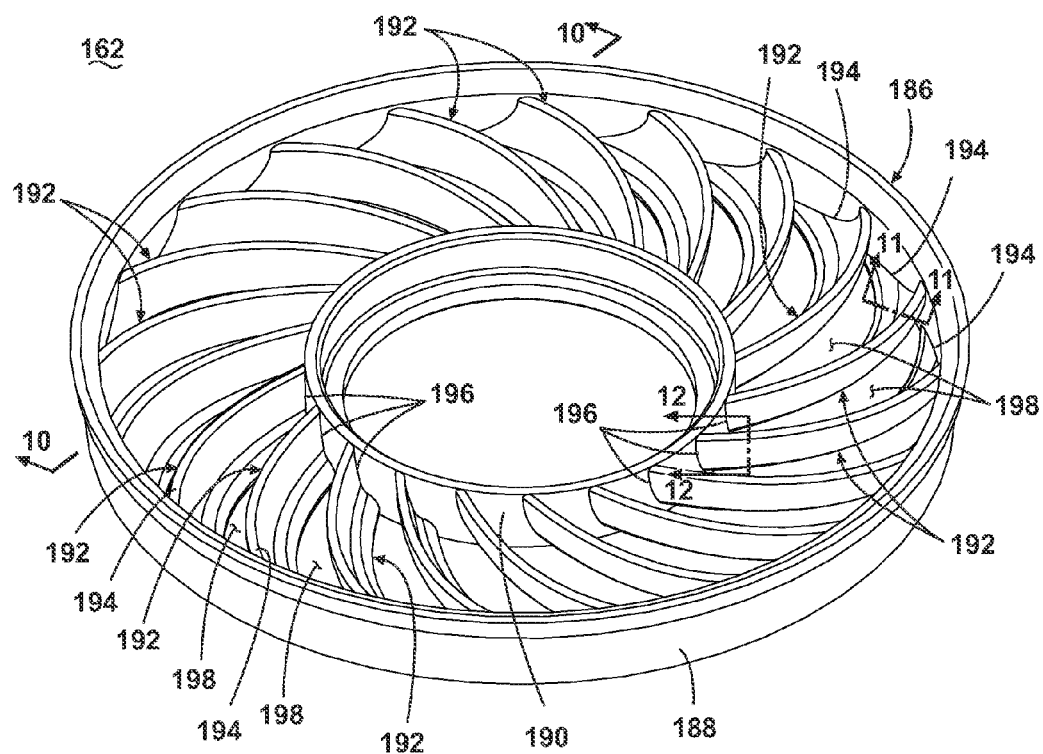
FIG. 9 is a perspective view of an exhaust grill of the cyclone module assembly of FIG. 7.
Figure 10:
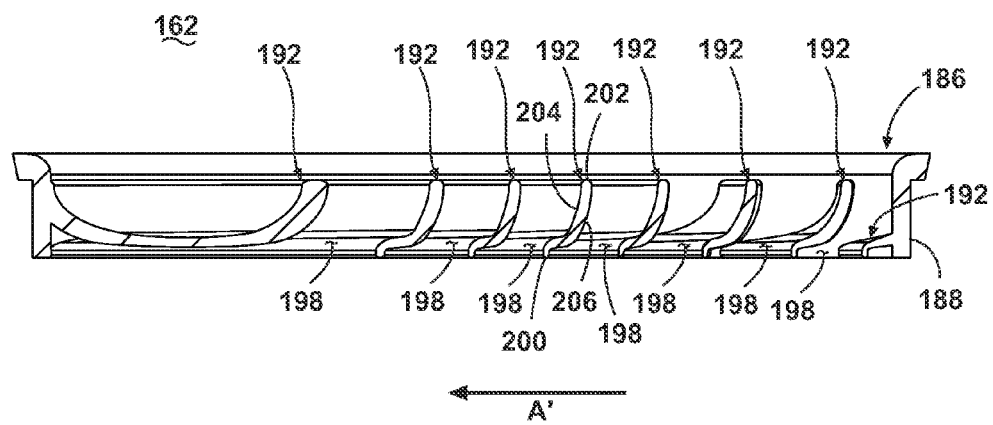
FIG. 10 is a cross-sectional view taken through line 10-10 of FIG. 9.

FIG. 9 is a perspective view of an exhaust grill of the cyclone module assembly of FIG. 7 and FIG. 10 is a cross-sectional view taken through line 10-10 of FIG. 9. The radially-extending louvers 192 include a first end 194 connected to the outer wall 188 and a second end 196 connected to the inner wall 190. The louvers 192 can be arranged in a spiral pattern, such that a straight line drawn from the inner wall 190 to the outer wall 188 will not pass through both the first and second ends 194, 196 of the louver 192. The arrangement of the louvers 192 in a spiral pattern increases the length, of the louvers 192 in comparison with straight, radial louvers. The greater length may increase the length of the air path along the louvers 192, which can increase the contact time between the working air and the louvers 192, thereby, increasing the likelihood of the working air shedding dirt particles.

The louvers 192 are spaced from each other to form a plurality of gaps 198, and the gaps 198 between the louvers 192 form air inlets to the passageway 166 leading to the second stage separator 36' (FIG. 7). Working air, which includes some entrained dirt particles, generally flows around the lower side of the exhaust grill 162 in a flow direction indicated by arrow A' (FIG. 10). As noted above for FIG. 2, while the working air flows along a path having both horizontal and vertical components, the magnitude of the horizontal component is greater than the magnitude of the vertical component, and so for purposes of simplification, is represented with respect to the exhaust grill 162 by the arrow A' having only a horizontal component with respect to central axis X'.

Each louver 192 includes a lower leading end 200 and an upper trailing end 202, which represent the ends of the louver 192 that firstly and lastly encounter the working air stream passing around the louver 192. Two opposing edges extend between the leading and trailing ends 200, 202; a downstream edge defining a downstream surface 204 of the louver 192 and an upstream edge defining an upstream surface 206 of the louver 192. Each gap 198 is formed by the upstream surface 206 of a first louver 192 and the downstream surface 204 of a second louver 192 that is immediately adjacent the first louver 192 in a direction opposite the flow direction A'.

Figures 11, 12:
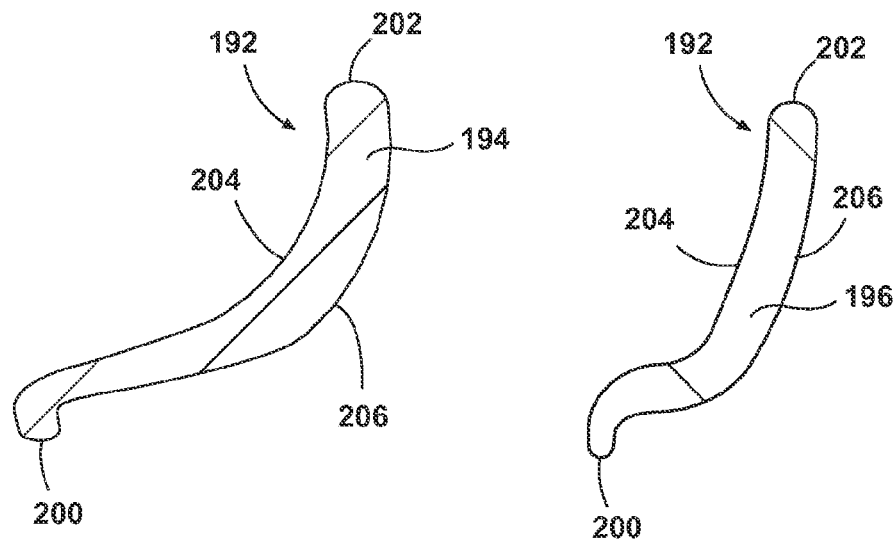
FIG. 11 is a cross-sectional view taken through line 11-11 of FIG. 9.
FIG. 12 is a cross-sectional view taken through line 12-12 of FIG. 9.

FIG. 11 is a cross-sectional view through line 11-11 of FIG. 9, showing the shape of the louver 192 at the first end 194 and FIG. 12 is a cross-sectional view through line 12-12 of FIG. 9, showing the shape of the louver 192 at the second end 196. Each louver 192 can have a varying profile, such that the first end 194 is more horizontal than the second end 192 when viewed in cross-section and that second end is more vertical than the first end 194 when viewed in cross-section, as shown in FIGS. 11 and 12. The varying profile can be configured to maintain the size of the gap 198 along the length of the louvers 192 between the first and second ends 194, 196 within a desired range, such as between 15.0 and 7.0 mm when measured between the leading ends 200 of adjacent louvers 192, or to give the louvers 192 an average gap size of 11.0 mm, where the average gap size is determined by averaging the gap measured between the leading ends 200 of adjacent louvers 192 at multiple points along the louvers 192. A smaller gap can increase the pressure drop caused by the exhaust grill 162, leading to a loss of suction power, while a larger gap can allow more dirt particles through the exhaust grill 162, leading to decreased cleaning performance. The desired range and/or average gap size can be chosen to optimize suction power and cleaning performance.

Figure 13:
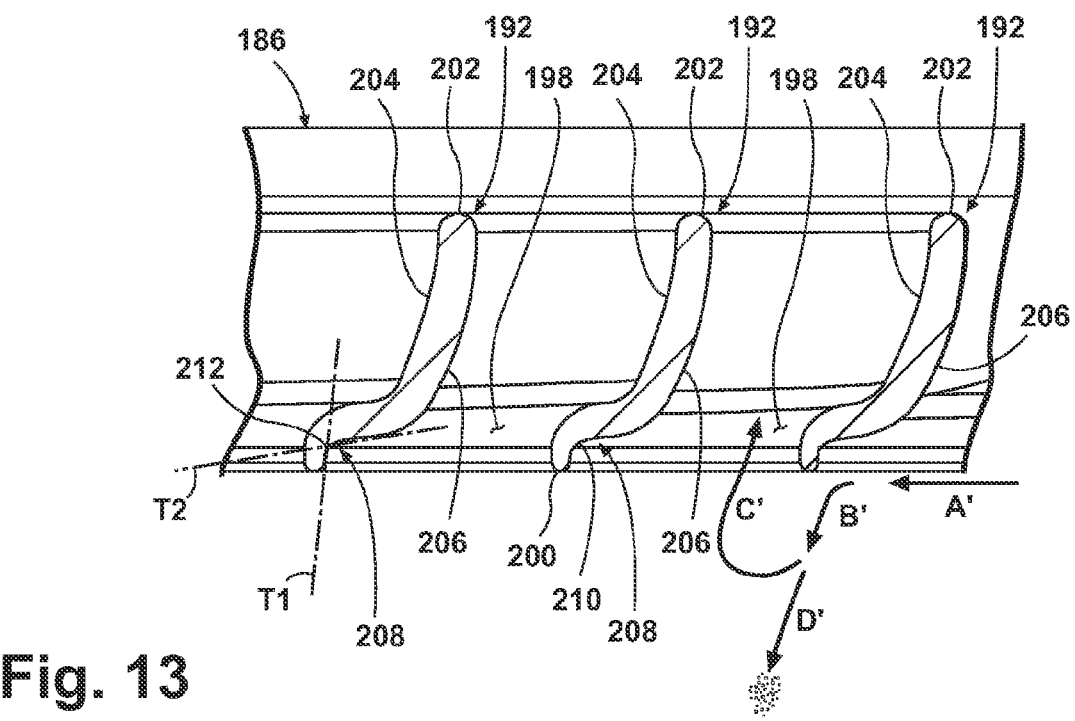
FIG. 13 is an enlarged view of a portion of the exhaust grill from FIG. 10.

FIG. 13 is an enlarged view of a portion of the exhaust grill from FIG. 10. The leading end 200 can include an airfoil tip 208 that is configured to deflect dirt particles away from the gap 198. In the illustrated embodiment, the airfoil tip 208 is formed by a curved guide surface 210 formed on the upstream surface 206. The guide surface 210 can be located at the lowermost portion of the upstream surface 206. The guide surface 210 can have a lower radius of curvature toward the leading end 200 as compared with the radius of curvature of the upstream surface 206 toward the trailing end 202. The guide surface 210 includes a transition point 212 which defines the point at which the slope of a first tangent line T1 on the side of the transition point 212 closer to the leading end 200 is greater than the slope of a second tangent line T2 on the side of the transition point 212 closer to the trailing end 202, which results in a concave crescent shape on the upstream surface 206 of the airfoil tip 208. While the airfoil tip 208 of the second embodiment is illustrated as having a guide surface 210 with a more exaggerated curvature in comparison with the guide surface 158 of the airfoil tip 156 of the first embodiment (FIG. 6), it is within the scope of the invention for the airfoil tip to be configured in the same manner as airfoil tip 156.

In operation, working air generally flows around the exhaust grill 162 in a flow direction indicated by arrow A'. The airfoil tip 208 directs the working air in an outward and downward direction from the louver 192, as indicated by arrow B'. This increases the downward or vertical velocity of the deflected working air in comparison to the horizontal velocity along the flow path indicated by arrow A'. The increased velocity of the working air along arrow B' increases the momentum of dirt particles entrained in the working air. The working air then turns back in toward louvers 192 and enters the interior of the exhaust grill 162 through the gaps 198, as indicated by arrow C'. Due to their increased momentum, at least some dirt particles may continue to move in a downwardly and radially outward direction from the louver 192, as indicated by arrow D', while working air turns back in toward the louver 192. The dirt particles are thereby separated from the working air and fall into the first stage collection chamber 58' of the dirt cup 38' (FIG. 7), and do not enter the interior of the exhaust grill 162.

FIGS. 14-17 illustrate an exhaust grill 220 according to a third embodiment of the invention. The exhaust grill 220 can be used with the cyclone module assembly 26' shown in FIG. 7-8 in place of the exhaust grill 162. In the third embodiment, the exhaust grill 220 includes a generally flat body 222 having circular shape. The body 222 can be ring-shaped, with a circular outer wall 224, a circular inner wall 226 that is radially-spaced inwardly from the outer wall 224, and a plurality of vanes or louvers 228 extending longitudinally between the inner and outer walls 224, 226. As illustrated, the louvers 228 are horizontally-oriented and, when the exhaust grill 220 is installed within the cyclone module assembly 26', extend generally radially from the central axis X' of the cyclone module assembly 26' (FIG. 7).

The radially-extending louvers 228 include a first end 230 connected to the outer wall 224 and a second end 232 connected to the inner wall 226. The louvers 228 can be arranged in a radial pattern, such that a straight line drawn from the inner wall 226 to the outer wall 224 will pass through both the first and second ends 230, 232 of the louver 228.

The louvers 228 are spaced from each other to form a plurality of gaps 234, and the gaps 234 between the louvers 228 can form air inlets to the passageway 166 leading to the second stage separator 36' (FIG. 7). Working air, which includes some entrained dirt particles, generally flows around the lower side of the exhaust grill 220 in a flow direction indicated by arrow A". As noted above for FIG. 2, while the working air flows along a path having both horizontal and vertical components, the magnitude of the horizontal component is greater than the magnitude of the vertical component, and so for purposes of simplification, is represented with respect to the exhaust grill 220 by the arrow A" having only a horizontal component with respect to central axis X' (FIG. 7).

Each louver 228 comprises a lower leading end 236 and an upper trailing end 238, which represent the ends of the louver 228 that firstly and lastly encounter the working air stream passing around the louver 228. Each louver 228 further has an approximately S-shaped profile, with a horizontal bottom wall 240 and a horizontal top wall 242 connected by and extending from a vertical center wall 244. The bottom and top walls 240, 242 extend in opposite directions from the center wall 244, with the bottom wall 240 extending in generally the same direction from the center wall 244 as the flow direction A". The bottom wall 240 terminates in the leading end 236 and the top wall 242 terminates in the trailing end 238. Two opposing edges extend between the leading and trailing ends 236, 238; a convex downstream edge of the bottom and center walls 240, 244 defining a downstream surface 246 of the louver 228 and a concave upstream edge of the bottom and center walls 240, 244 defining an upstream surface 248 of the louver 228. Each gap 234 is formed by the upstream surface 248 of a first louver 228 and the downstream surface 246 of a second louver 228 that is immediately adjacent the first louver 228 in a direction opposite the flow direction A". While the louvers 228 are not shown as having an airfoil tip, it is within the scope of the invention for the louvers 228 to be provided with airfoil tip to be configured in the same manner as airfoil tip 156 or 208.

Figure 14:
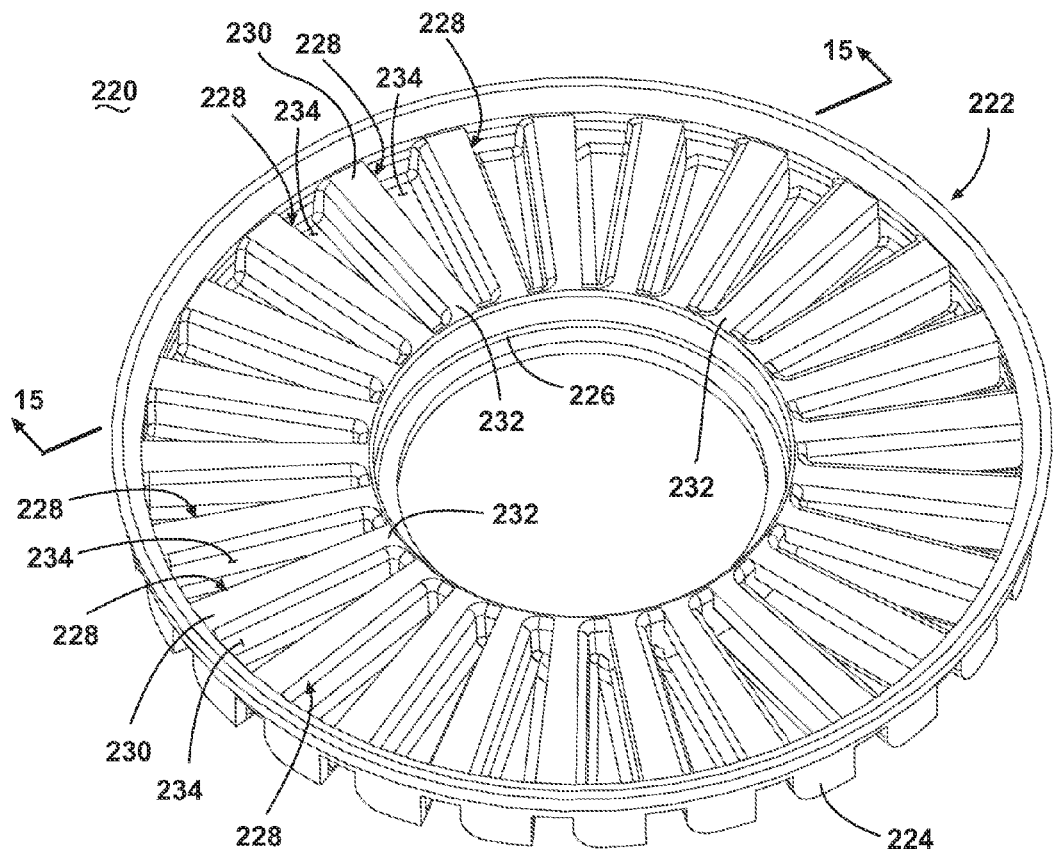
FIG. 14 is a perspective view of an exhaust grill according to a third embodiment of the invention.
Figure 15:
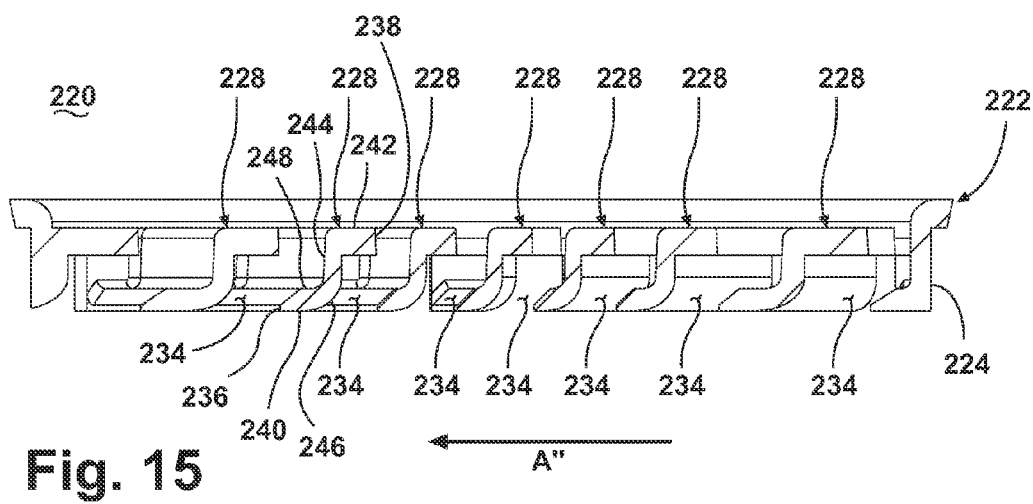
FIG. 15 is a cross-sectional view of the exhaust grill taken through line 15-15 of FIG. 14.
Figure 16:
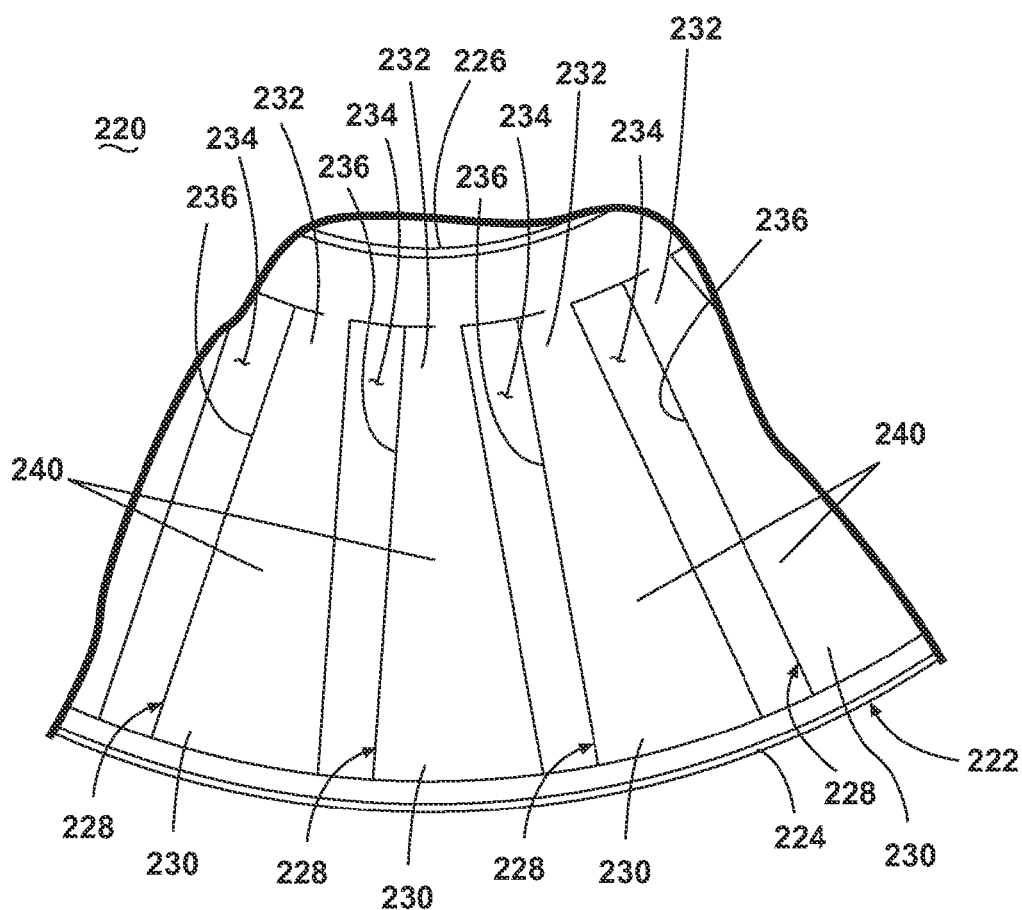
FIG. 16 is a bottom plan view of the exhaust grill of FIG. 14.

FIG. 16 is a bottom plan view of the exhaust grill of FIG. 14. The bottom wall 240 of each louver 228 can comprise a wedge-like shape, such that the first end 230 is wider than the second end 232, when viewed from the bottom of the exhaust grill 220. The wedge-like shape can be configured to maintain the size of the gap 234 between leading lower ends 236 along the length of adjacent louvers 228 between the first and second ends 230, 232 within a desired range, such as between 25 and 12 mm when measured between the lower ends of adjacent louvers 228, or to give the louvers 228 an average gap size of 18.5 mm, where the average gap size is determined by averaging the gap measured between the lower ends of adjacent louvers 228 at multiple points along the louvers 228. The desired range and/or average gap size can be chosen to optimize suction power and cleaning performance.

Figure 17:
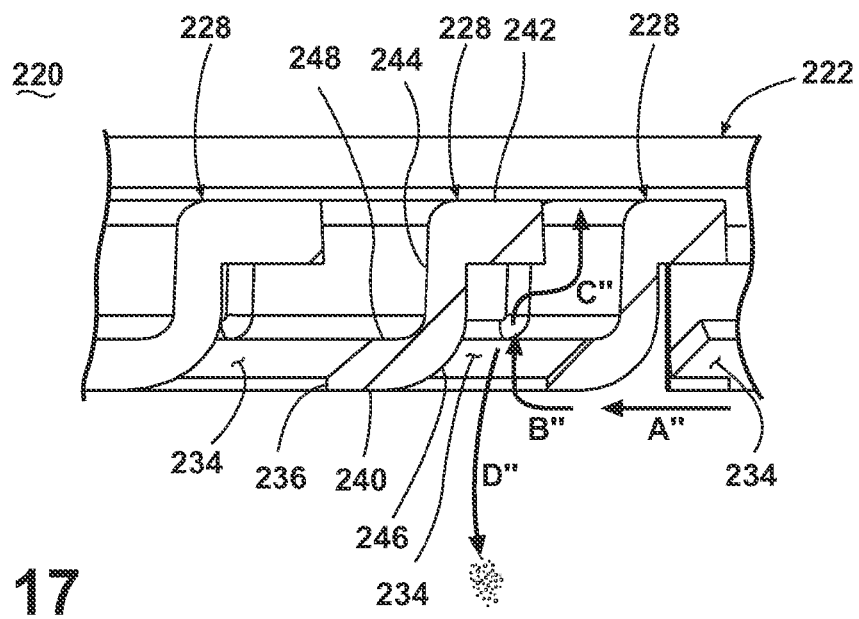
FIG. 17 is an enlarged view of a portion of the exhaust grill from FIG. 14.

FIG. 17 is an enlarged view of a portion of the exhaust grill from FIG. 14. In operation, working air generally flows around the exhaust grill 220 in a flow direction indicated by arrow A". The working air then turns in toward louvers 228 and through the gaps 234, as indicated by arrow B". Due to the S-shaped profile of the louvers 228, the working air must follow a tortuous path around the bottom, center, and top walls 240, 244, 242 to enter the interior of the exhaust grill 220, as indicated by arrow C". Due to the tortuous path, at least some dirt particles may be shed from the working airflow, as indicated by arrow D". The dirt particles are thereby separated from the working air and fall into the first stage collection chamber 58' of the dirt cup 38' (FIG. 7), and do not enter the interior of the exhaust grill 220.

While the invention has been specifically described in connection with certain specific embodiments thereof, it is to be understood that this is by way of illustration and not of limitation. For example, while the cyclone module assemblies illustrated herein are shown having two concentric stages of separation, it is understood that the louvered exhaust grill could be applied to a single stage separator, multiple parallel first and/or second stage, or additional downstream separators, or other types of cyclone separators. Reasonable variation and modification are possible with the scope of the foregoing disclosure and drawings without departing from the spirit of the invention which, is defined in the appended claims. Hence, specific dimensions and other physical characteristics relating to the embodiments disclosed herein are not to be considered as limiting, unless the claims expressly state otherwise.

What is claimed is:

1. A vacuum cleaner comprising:
  a housing having a suction nozzle;
  a separation module having at least one separator chamber defining a central axis and an air outlet;
  a suction source fluidly connected to the suction nozzle and to the separation module for establishing and maintaining a dirt-containing working airstream from the suction nozzle to the at least one separator chamber; and
  an exhaust grill positioned downstream of the at least one separator chamber and upstream of the air outlet, and comprising:
    a plurality of louvers; and
    a plurality of inlets defined between adjacent louvers;

wherein at least one of the louvers comprises an upstream surface with an airfoil tip curved outwardly away from the inlets to deflect dirt away from at least one of the plurality of inlets.

2. The vacuum cleaner of claim 1, wherein the plurality of louvers are substantially parallel to the central axis.

3. The vacuum cleaner of claim 2, wherein the exhaust grill is cylindrical.

4. The vacuum cleaner of claim 1, wherein the louvers extend radially outwardly from the central axis.

5. The vacuum cleaner of claim 4, wherein the plurality of louvers are arranged in one of a spiral pattern and a radial pattern.

6. The vacuum cleaner of claim 4, wherein the exhaust grill comprises a flat, circular body having a radius greater than its height.

7. The vacuum cleaner of claim 6, wherein the exhaust grill is ring-shaped, with a circular outer wall and a circular inner wall spaced inwardly of the outer wall, and wherein the plurality of louvers extend between the inner and outer walls.

8. The vacuum cleaner of claim 1, wherein the at least one of louvers comprises a leading end and a trailing end, and the airfoil tip is provided on the leading end.

9. The vacuum cleaner of claim 8, wherein the at least one of the louvers comprises a downstream edge extending between the leading and trailing ends that defines a downstream surface of the at least one of louvers, and an upstream edge extending between the leading and trailing ends that defines the upstream surface of the at least one of louvers, wherein the airfoil tip comprises a curved guide surface formed on the upstream surface.

10. The vacuum cleaner of claim 9, wherein the guide surface comprises a smaller radius of curvature toward the leading end as compared with the radius of curvature of the upstream surface toward the trailing end.

11. The vacuum cleaner of claim 9, wherein the guide surface comprises a transition point which defines the point at which the slope of a first tangent line on the side of the transition point closer to the leading end is one of less than and greater than the slope of a second tangent line on the side of the transition point closer to the trailing end.

12. The vacuum cleaner of claim 9, wherein the guide surface comprises a concave crescent shape on the upstream surface.

13. The vacuum cleaner of claim 1, wherein at least two adjacent louvers comprises a varying profile along the length of the louvers that is configured to maintain the size of the inlet defined between the adjacent louvers.

14. The vacuum cleaner of claim 1, wherein the exhaust grill is stationary.

15. A vacuum cleaner comprising:
a housing having a suction nozzle;
a separation module having a cyclone separator chamber defining a central axis and an air outlet;
a suction source fluidly connected to the suction nozzle and the separation module for establishing and maintaining a dirt-containing flow of working air from the suction nozzle, through the separator chamber and through the air outlet, wherein the working air circulates through the separator chamber in a circular direction around the central axis; and
an exhaust grill positioned downstream of the separator chamber and upstream of the air outlet, and comprising:
a plurality of louvers, wherein the louvers define air passages between them that are transverse to the circular flow of working air in the separator chamber and are oriented so that the air is at least partially reversed in direction as it passes from the separator chamber through the louvers between a leading end and a trailing end; and
wherein the louvers comprise an upstream surface and a downstream surface and have at the leading end an airfoil tip that is transverse to the circular flow of working air though the separator chamber and is curved outwardly on the upstream surface away from the air passages to deflect the working air transverse to the circular direction of the flow of the working air in the separator chamber and away from the louvers to separate debris from the flow of working air prior to the flow of working air through the louver air passages.

16. The vacuum cleaner of claim 15, wherein the exhaust grill is stationary.

* * * * *